Feb. 23, 1937.  A. B. KRAUSE ET AL  2,071,881
RECEPTACLE COVER
Filed Dec. 9, 1932
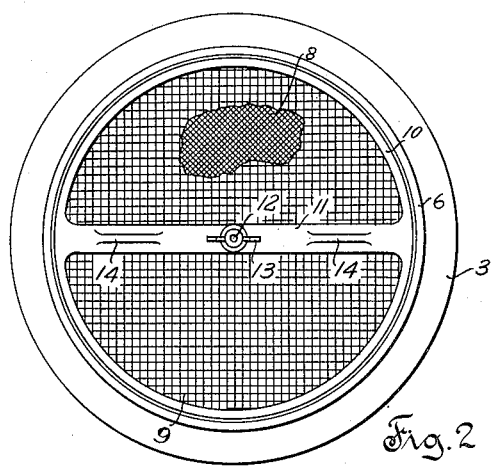
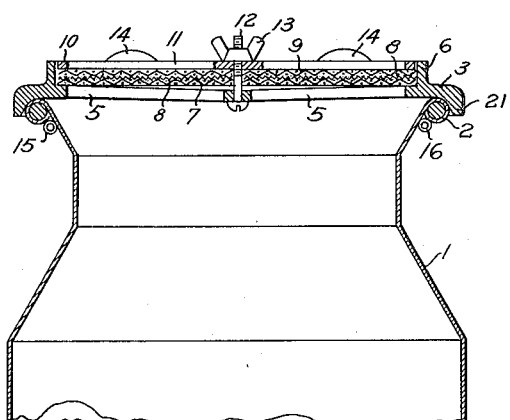
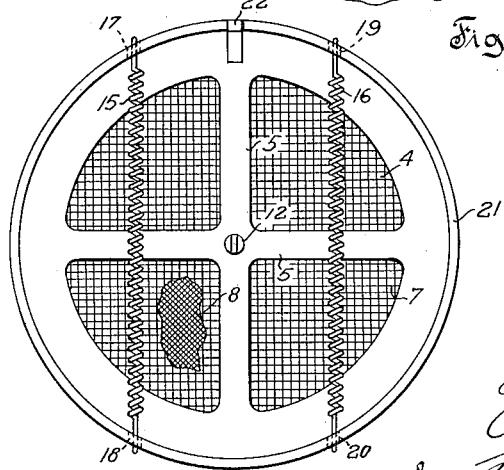
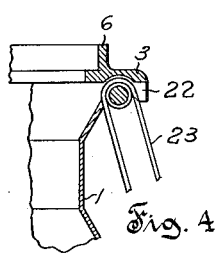

Patented Feb. 23, 1937

2,071,881

UNITED STATES PATENT OFFICE 2,071,881

RECEPTACLE COVER

Agnes B. Krause and Paul J. Krause, Milwaukee, Wis.

Application December 9, 1932, Serial No. 646,508

2 Claims. (Cl. 220—44)

This invention relates to receptacle covers. It is particularly adapted for use in connection with receptacles adapted to contain fluids which it is desired to cool or which give off or take on gases, or in which several or all of such actions are involved, and which fluids should be protected from the access of dust, insects, rodents, or any kind of foreign bodies. More specifically, it is adapted for use in connection with receptacles adapted to contain milk.

In the case of milk, it is generally considered undesirable, after the warm milk is placed into the milk cans, to seal the cans with tight covers. In many cases the volatile products contained in the milk will be retained in the milk after it has cooled and give it an undesirable flavor. It is also though that access of air while the milk is cooling may have a beneficial effect.

An object of the invention is the provision of means whereby the contents of the receptacle is adequately protected while permitting ingress and egress of gases.

Another object is the provision of a receptacle cover which is easily applied and remains firmly in place and yet is easily removable.

Still another object is the provision of a receptacle cover having screening means which is readily removable and replaceable. Other objects will appear hereinafter as the description of the invention proceeds.

The novel features of the invention will appear from this specification and the accompanying drawing forming a part thereof and showing one embodiment of the invention and all these novel features are intended to be pointed out in the claims.

In the drawing, Fig. 1 is a sectional elevation of one embodiment of the invention, the receptacle being fragmentarily shown;

Fig. 2 is a top view of the receptacle cover shown in Fig. 1;

Fig. 3 is a bottom view of the receptacle cover shown in Fig. 1; and

Fig. 4 is a fragmentary sectional view of a detail.

Referring to Fig. 1 of the drawing, there is here shown in section the upper portion of a milk can 1. The can 1 here shown is provided with a top or mouth having a beaded edge 2.

The mouth of the can 1 is provided with a cover 3 having an opening 4 therein. The cover 3 is provided with a spider 5 having any suitable number of arms, four being here shown. The spider arms of course divide the opening 4 in the instant case into four quadrants.

The cover 3 is provided with an upstanding flange 6 which is of larger internal diameter than the diameter of the opening 4, for the purpose of positioning and retaining a screening means which will now be described.

The screening means is here shown as comprising a metallic screen 7, which may be of the order of mesh, for example, as in window screen. On top of the metallic screen 7, as viewed in Fig. 1, is a sheet of fabric 8, which may, for example, be muslin. On top of the fabric 8 is an outer metallic screen 9 which may be of the same character as the metallic screen 7. In order to more clearly show the members 7, 8, and 9, their thickness has been very considerably exaggerated, and so has the relative height of the flange 6.

While the composite screening means hereinbefore described has advantages over non composite screening means, it will be understood that suitable non composite screening means may be utilized.

The screening means may be clamped in position by means of a clamping ring 10 which fits within the flange 6. The clamping pressure is here shown as secured by a screw 12 which passes through the center of the spider 5 and through a cross bar 11 carried by the ring 10. The screw 12 is provided with a wing nut 13 and by tightening up this nut the ring 10 will firmly clamp the screening means between the ring and the cover 3. The cross bar 11 of the ring 10 may be provided with suitable hand holds 14.

Referring particularly to Fig. 3 which shows the bottom of the cover 3, the cover is here shown as provided with two substantially parallel springs 15, 16 of helical form. These springs have their respective ends fastened to the outer periphery of the cover 3, and in this instance the ends of spring 15 pass through holes 17, 18 in a flange 21 on the outer periphery of the cover 3, which flange extends downwardly as viewed in Fig. 1. In like manner the ends of the spring 16 extend through holes 19, 20 in said flange 21. The ends of the springs may be retained in the holes in the flange 21 as by clinching the ends, or the ends of the springs may be fastened to the outer periphery of the cover in any other suitable manner.

It will be apparent that by grasping the springs 15, 16, one in each hand, and placing the cover on top of the can 1 and then pulling the springs down underneath the bead 2, the cover 3 will be firmly retained in position, and that it cannot only be easily placed in position but can be easily removed.

It will of course be obvious that volatiles may readily escape from the milk through the screening means 7, 8, 9, and at the same time not only will the entrance of dust and other foreign objects be prevented, but the nature of the screening means will prevent rodents or the like from gnawing their way through the same.

As shown in Figs. 3 and 4, the cover 3 may be provided with a notch 22 to accommodate a wire 23 which is usually present, the wire 23 being used to retain the usual cover (not shown).

It should be understood that it is not desired to limit the invention to the exact details of construction shown and described, for various modifications may occur to persons skilled in the art.

We claim:

1. An aerating cover for a milk can, comprising: a first relatively rigid member constructed and arranged to overlie the mouth of a milk can, said member being provided with a plurality of relatively large openings therethrough; a second relatively rigid member opposed to said first member, and means mounting said second member from said first member rotatable relative to said first member, said second member also being provided with a plurality of relatively large openings therethrough; and a fine-mesh dust-excluding screen interposed between said members, said members serving to support and protect said screen; the openings in said members being so constructed and arranged to provide passageway through said screen in every relative rotative position of said members.

2. As an article of manufacture, an aerating cover for a milk can, as distinguished from strainer funnels for use in pouring milk into or from a milk can, said cover being substantially flat; said cover comprising a relatively rigid rim, the underneath side of which is provided with a seat constructed and arranged to seat on the mouth of a milk can; said rim being provided with an aerating opening, and said cover comprising a screen disposed across said opening; said cover comprising also a relatively heavy reticulated member overlying said screen, constructed and arranged to protect said screen; means projecting from said rim beyond said screen to position said member laterally; said cover comprising means connecting said member and said rim, clamping said member and said rim together.

AGNES B. KRAUSE.
PAUL J. KRAUSE.